United States Patent
Knox

[11] Patent Number: 6,050,595
[45] Date of Patent: Apr. 18, 2000

[54] PEEL BACK METHOD AND APPARATUS FOR DEPLOYABLY CONCEALING AN AIR BAG BEHIND AN INSTRUMENT PANEL

[75] Inventor: Jonathan Knox, Rochester, N.H.

[73] Assignee: Textron Automotive Company Inc., Troy, Mich.

[21] Appl. No.: 09/026,213

[22] Filed: Feb. 19, 1998

[51] Int. Cl.$^7$ .................................................. B60R 21/20
[52] U.S. Cl. ...................................... 280/728.3; 280/732
[58] Field of Search ................................ 280/728.3, 732, 280/752, 730.1

[56] References Cited

U.S. PATENT DOCUMENTS

| | | |
|---|---|---|
| 5,217,244 | 6/1993 | Bauer . |
| 5,333,901 | 8/1994 | Barnes . |
| 5,340,149 | 8/1994 | Gajewski ............................. 280/728.3 |
| 5,342,088 | 8/1994 | Bauer . |
| 5,375,875 | 12/1994 | DiSalvo et al. . |
| 5,375,876 | 12/1994 | Bauer et al. . |
| 5,390,950 | 2/1995 | Barnes et al. . |
| 5,445,410 | 8/1995 | Czapp et al. . |
| 5,478,106 | 12/1995 | Bauer et al. . |
| 5,496,059 | 3/1996 | Bauer . |
| 5,498,027 | 3/1996 | Kelley et al. . |
| 5,544,912 | 8/1996 | Sommer ............................... 280/728.3 |
| 5,549,345 | 8/1996 | Cawthon et al. . |
| 5,590,903 | 1/1997 | Phillion et al. . |

*Primary Examiner*—Peter C. English
*Attorney, Agent, or Firm*—Reising, Ethington, Barnes, Kisselle, Learman & McCulloch, P.C.

[57] ABSTRACT

A method for deployably concealing an air bag behind an instrument panel which includes a decorative plastic skin that covers a structural panel and a door that covers an opening in the panel. The panel includes a retainer and an outer foam layer adhered to a retainer outer surface. The door pivots on a hinge at a rear margin of the door. The skin is adhered to outer surfaces of the door and the panel. When closed, the door outer surface lies flush with the panel outer surface forming a seam between the door and the panel. The skin extends across the seam to conceal the door and panel. When opened, a front edge of the door pivots away from the opening to provide an air bag deployment path through the panel. A portion of the skin surrounding the door separates from the outer foam layer of the panel. The skin peels back to form a skin "tent" when the door opens. A delaminated front edge of the skin forms a tent opening that serves as an exit for the deploying air bag. The skin may also extend around an air conditioning bezel mounted in the panel and axially inward between the bezel and the panel. In this case, the bezel is axially outwardly movable when the skin is peeled back and is pulled outward from between the bezel and the panel.

27 Claims, 3 Drawing Sheets

PEEL BACK METHOD AND APPARATUS FOR DEPLOYABLY CONCEALING AN AIR BAG BEHIND AN INSTRUMENT PANEL

TECHNICAL FIELD

This invention relates generally to supplemental inflatable restraint systems (SIRS) that are housed within a vehicle interior trim product behind or below an opening in the trim product and, more particularly, to air bag closure assemblies that cover the opening and open in response to air bag inflation.

INVENTION BACKGROUND

Supplemental inflatable restraint systems (SIRSs) require air bag closure assemblies to prevent vehicle occupants from tampering with the system and to provide a path through which air bags may deploy into vehicle passenger compartments. Some prior art SIRS closure assemblies include at least one air bag door that is hinged to swing open in response to air bag inflation. This type of door may be mid-mounted on the front vertical face of an instrument panel as shown in U.S. Pat. No. 3,708,179 or may be mounted on an upper surface of an instrument panel or dash board as shown in U.S. Pat. No. 5,498,027.

An air bag closure assembly of this type must have some means of holding the air bag door closed over the air bag deployment opening in the vehicle instrument panel. Such means must be able to secure the air bag door against occupant tampering but must readily release the door when an air bag deploys. For example, U.S. Pat. No. 5,498,027 issued Mar. 12, 1996 to Kelley et al. discloses an air bag closure assembly mounted over an air bag deployment opening in an automotive instrument panel. The air bag closure assembly includes a generally rectangular door supported and spaced above the instrument panel on a generally rectangular doorframe. Fasteners secure the doorframe to an upper surface of the instrument panel around the deployment opening. The door is hinged along one edge to open upward and away from the doorframe, providing a path for an air bag through the instrument panel. Foam layers are formed over the respective upper surfaces of the door and the doorframe. A skin is bonded to an upper surface of the door foam layer and marginally overlaps the door along three of four peripheral edges. The marginally overlapping portions of the door skin are draped over the three non-hinged door edges and are bonded to respective side surfaces of the door frame foam layer. This forms a seam between the foam layer and a surrounding applique or trim piece that clearly outlines the location of the air bag door. When a deploying air bag forces the door to open upward, the opening door tears loose the marginally overlapping portion of the door skin from the side surfaces of the door frame foam layer.

For aesthetic purposes, it is desirable for air bag closure systems of this type to include some means for concealing the air bag door from the view of vehicle occupants. It is especially desirable that such means provide a smooth unbroken, unmarked instrument panel upper or outer surface that includes no seams, edges or other discontinuities that might betray the presence of a supplemental inflatable restraint system. It is also desirable that such systems include some means for preventing the air bag door from breaking free of the instrument panel and flying loose in the passenger compartment.

One well-known method of concealing an air bag door is to mount the door such that the door outer surface lies flush with the instrument panel outer surface. A skin is then bonded across the outer surfaces of the air bag door and the instrument panel to hide the seam between the door and the panel. Air bag closure/deployment systems of this type will also include either some implement to cut through or initiate tearing in the skin when the air bag deploys, or a hidden tear seam formed on the lower side of the skin. However, the addition of a cutting implement and the formation of a hidden tear seam each require at least one additional step in the process of manufacturing an air bag door cover assembly.

What is needed is an air bag door cover assembly that includes means for concealing the air bag door and securing the door against occupant tampering and from breaking free during air bag deployment. What is also needed is such an assembly that has an improved appearance, reduced weight, fewer parts and is less expensive to manufacture.

INVENTION SUMMARY

In accordance with this invention an air bag closure assembly is provided that includes a skin that covers a panel and an air bag door mounted in an air bag deployment opening in the panel, the skin being configured to peel back from the panel when the air bag inflates and forces the door open. The assembly comprises a trim member that includes the panel, air bag door and skin. The door has a front edge, a rear margin opposite the front edge and a pair of side edges. The door is supported for pivotal movement around a hinge disposed adjacent the rear margin of the door and the air bag deployment opening. The skin is supported on outer surfaces of the door and the trim member panel. The assembly has a closed position in which the door closes the opening and the door outer surface is disposed flush with the panel outer surface forming a seam between the door and the panel. In the closed position the skin extends laterally across the seam between the flush door and panel outer surfaces in a layered disposition to conceal the door and panel from vehicle occupants. The assembly also has an open position in which the front edge of the door is pivoted away from the opening around the hinge to provide an air bag deployment path through the panel. The skin is at least partially separable from at least a portion of the panel outer surface that extends laterally outward from the side edges of the door and from the front edge of the door to a front edge of the skin adjacent the front edge of the door. The skin delaminates when the door carries the skin outwardly and lifts the skin from the panel outer surface as the air bag inflates and forces the door out of the closed position toward the open position. The skin forms a skin tent over the door when the door is out of the closed position. The skin tent has a skin tent opening formed by the delaminated front edge of the skin. The skin delaminates to absorb door opening forces and forms a tent over the door to prevent the door from breaking free of the trim panel and becoming a projectile. The skin tent opening provides an exit for the deploying air bag.

In accordance with another aspect of the invention the skin covers and adheres to an area of the panel outer surface that exceeds the area of the door outer surface. This broad contact area tends to prevent the skin from completely peeling free of the panel.

In accordance with another aspect of the invention the skin has an edge region that remains adhered to a portion of the panel when the front edge delaminates. By remaining adhered to the panel, the edge region helps form the tent and limits how far the door can open.

In accordance with another aspect of the invention the skin comprises an outer membrane of plastic material and may include an inner foam layer adhered to a membrane inner surface.

In accordance with another aspect of the invention the inner foam layer may be made of the same composition as the plastic material.

In accordance with another aspect of the invention the plastic material comprises material from the group including urethanes, vinyls, olefins, esters, styrenes and rubbers.

In accordance with another aspect of the invention the inner foam layer is adhered to the membrane inner surface with sufficient strength that the inner foam layer remains with the membrane and delaminates from the panel outer surface when the assembly moves out of the closed position toward the open position.

In accordance with another aspect of the invention the panel includes a retainer. An outer foam layer is adhered to an outer surface of the retainer.

In accordance with another aspect of the invention the outer foam layer is adhered to the outer surface of the retainer with sufficient strength that the outer foam layer remains with the retainer and delaminates from the skin when the assembly moves out of the closed position toward the open position.

In accordance with another aspect of the invention the foam layer is adhered to both the outer surface of the retainer and the inner surface of the skin with sufficient strength to cause tearing to occur in the foam layer when the assembly moves out of the closed position toward the open position. The foam layer tears into upper and lower foam lamina that remain adhered to the skin and retainer, respectively.

In accordance with another aspect of the invention the skin has a generally uniform unweakened thickness throughout its covering of the door and panel. There are no marks or discontinuities to betray the presence of an air bag door beneath the skin.

In accordance with another aspect of the invention a bezel is mounted in a bezel receptacle in the panel and is movable in an axial outward direction from a mounted position in the receptacle. The skin extends around the bezel and into the receptacle between a bezel outer surface and a receptacle inner surface. The skin is sandwiched between the bezel outer surface and the receptacle inner surface when the bezel is in the mounted position. The bezel is axially outwardly movable from the mounted position when the skin is pulled outward from between the bezel outer surface and the receptacle inner surface. A mooring arrests the axial outward motion of the bezel from the mounted position as the skin is delaminated from the panel outer surface and is withdrawn from between the bezel and the receptacle. The mooring prevents the bezel from becoming a projectile during air bag deployment.

In accordance with another aspect of the invention the mooring comprises a clip connected to the bezel. The clip has a hook portion that extends in a generally outward radial direction from the bezel outer surface. The receptacle includes a receptacle detent that is axially aligned with the hook portion of the clip and is engageable with the hook portion when the bezel is pulled axially out of the mounted position.

In accordance with another aspect of the invention the receptacle detent is disposed on an inner edge of the bezel receptacle. The hook portion of the clip is engageable with the inner edge of the bezel receptacle when the bezel is pulled axially out of the mounted position.

Also in accordance with the invention a method is provided for deployably concealing an air bag. The method includes the steps of providing a trim member including a panel and a skin, providing an air bag deployment opening in the panel, providing a door in the opening to close the opening with the door outer surface disposed flush with the panel outer surface and forming a seam between the door and the panel, supporting the door for pivotal movement around a hinge disposed adjacent a rear margin of the door and the air bag deployment opening such that a front edge of the door can be pivoted away from the opening around the hinge to provide an air bag deployment path through the panel, and attaching the skin to the flush door and panel outer surfaces in a continuous layered disposition spanning the seam. The skin is attached in such a way that the skin can be at least partially delaminated from at least a portion of the panel outer surface that extends laterally outward from the side edges and front edge of the door to a front edge of the skin adjacent the front edge of the door.

In accordance with another aspect of the invention, the "attaching step" of the method includes the additional step of providing an adhesive between the skin and the outer surfaces of the door and panel.

BRIEF DRAWING DESCRIPTION

To better understand and appreciate the invention, refer to the following detailed description in connection with the accompanying drawings.

DETAILED PREFERRED EMBODIMENT DESCRIPTION

Figure 1:
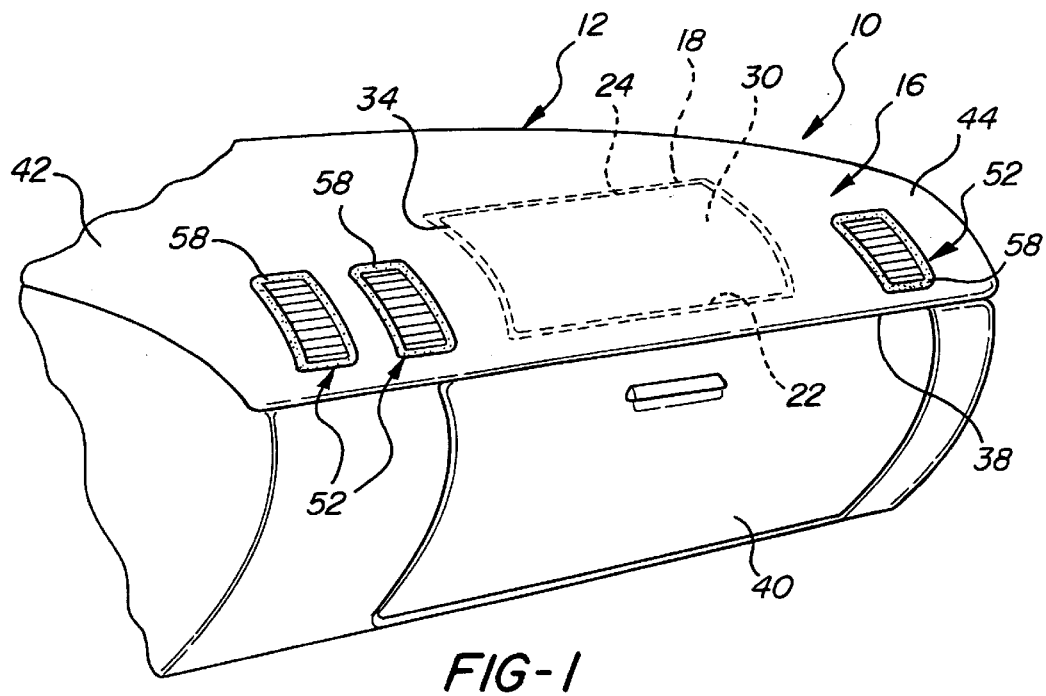
FIG. 1 is a perspective view of a vehicle dash panel including an air bag closure assembly constructed according to the present invention and with a door portion of the assembly in a closed position.
Figure 2:
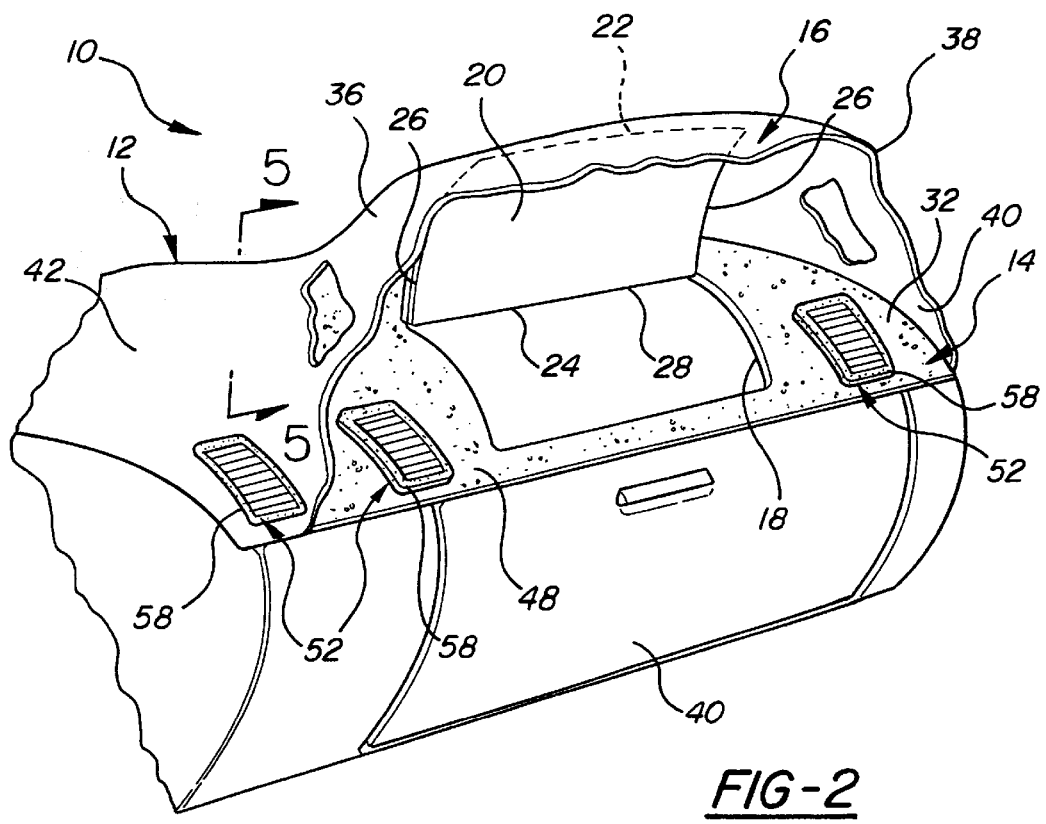
FIG. 2 is a perspective view of the vehicle dash panel and air bag closure assembly of FIG. 1 with the door in an open position.

An air bag closure assembly 10 constructed according to the present invention is generally shown at 10 in FIGS. 1 and 2. The assembly 10 comprises a trim member such as an instrument or dash panel generally indicated at 12 in FIGS. 1–5. The trim member 12 includes a structural panel generally indicated at 14 and a decorative skin generally indicated at 16. A first embodiment of the panel and skin structure of the assembly 10 is generally indicated at 14, 16 in FIGS. 2–5. Second and third embodiments of the panel 14 and skin 16 structure of the assembly 10 are generally indicated at 14', 16' in FIG. 6 and 14", 16" in FIG. 7, respectively. Reference numerals with the designation prime (') in FIG. 6 indicate alternative configurations of elements that also appear in the first embodiment. Similarly, reference numbers with the designation double prime (") in FIG. 7 indicate alternative configurations of elements that also appear in the first and/or second embodiments. Where a portion of the following description uses a reference numeral to refer to the figures, I intend that portion of the description to apply equally to elements designated by primed numerals in FIGS. 6 and 7.

An air bag deployment or panel opening, shown at 18 in FIG. 2, is disposed in the panel 14. A door, shown at 20 in FIG. 2, is supported in a position to close the panel opening. As shown in FIG. 2, the door 20 is generally rectangular in shape and has a front edge 22, a rear margin 24 opposite the front edge 22 and a pair of side edges 26. In the present embodiment the rear margin 24 of the door 20 is the transition to the instrument panel 12 from the door 20 rather than a definite edge that defines a gap or physical separation between the door 20 and the instrument panel 12. However, in other embodiments, the rear margin 24 may include such an edge rather than a transition. The door 20 is supported on the panel 14 for pivotal movement around a hinge 28. The hinge 28 is disposed adjacent the rear margin 24 of the door 20 and the air bag deployment opening 18. The hinge 28 may be of the conventional pin and sleeve type or may, as shown in FIG. 2, be a living hinge. As a living hinge, the hinge 28 comprises a bendable length of material connected along one edge to the door and along the other edge to the panel. In addition, the rear margin 24 of the door 20 may itself comprise a living hinge. The rear margin 24 may comprise a living hinge where, for example, the door 20 is integrally formed with the panel 14 as a single unitary piece.

The skin 16 may be any form of flexible covering to include a soft decorative plastic covering. The skin 16 is supported on outer surfaces 30, 32 of the door 20 and the panel 14. The assembly 10 has a closed position as shown in FIG. 1. In the closed position the door 20 closes and is disposed within the opening 18 and the door outer surface 30 is disposed flush with the panel outer surface 32. This forms a seam 34 between the door 20 and the panel 14. The skin 16 extends laterally across the seam 34 between the flush door and panel outer surfaces 30, 32 in a layered disposition. This forms a skin transition that conceals the seam between the door 20 and panel 14 from vehicle occupants. Preferably, the skin transition over the seam results in a surface with no visible transition between the door 20 and retainer panel 14. However, a style line or recessed channel may be used at or near the interface.

The assembly 10 has an open position, shown in FIG. 2, in which the front edge 22 of the door 20 is pivoted away from the opening 18 around the hinge 28 to provide an air bag deployment path through the panel 14. The skin 16 is partially separable, i.e., delaminable, from the panel outer surface 32. The skin 16 separates from a portion of the panel outer surface 32 that extends laterally outward from the side edges 26 and from the front edge 22 of the door 20 to a front edge 38 of the skin 16 adjacent the front edge 22 of the door 20. The skin 16 delaminates, or "peels back," when the door 20, forced open by air bag inflation, carries the skin 16 outwardly and lifts the skin 16 from the panel outer surface 32.

As shown in FIG. 2, the skin 16 may form a skin tent 36 over the door 20 when the door 20 is out of the closed position. A skin tent is a skin configuration in which the skin 16 overlies a generally upright support (the door 20 in this case) but has sufficient girth to drape from the support (the door front and side edges 22, 26) and touch or be attached to a surface below the support, e.g., the panel outer surface 32. The skin 16 delaminates to absorb door-opening forces. While the hinge is the primary door restraint, a skin tent 36 over the door 20 will secondarily aid in restraining the door. The skin tent 36 does this by preventing the door 20 or a portion of the door 20 from breaking free of the trim panel 14 and becoming a projectile during air bag deployment. As is also best shown in FIG. 2, the skin 16 has a front edge 38 that delaminates and forms an opening 40 in the skin tent 36. The skin tent opening 40 provides a path for the deploying air bag to get out from under the skin 16 and deploy into the passenger compartment.

As shown in FIGS. 1 and 2, the skin 16 covers and adheres to a surrounding portion of the panel outer surface 32 that is greater in area than the door outer surface 30. This surrounding portion extends forward from the air bag deployment opening 18 to a front edge of the panel 14 adjacent a top edge of a glove compartment 41. The surrounding portion extends laterally outward from the air bag deployment opening 18 to side edges of the panel 14.

The skin 16 has an edge region, shown at 42 in FIGS. 1 and 2, that remains adhered to a portion of the panel 14 when the front edge 38 of the skin delaminates. The edge region 42 remains adhered to the panel 14 adjacent side edges and a rear margin of the panel 14 as shown in FIGS. 1 and 2. By remaining attached to the panel 14, the edge region therefore helps form the skin tent 36. By remaining adhered to the panel 14 the edge region also arrests the door 20 in a fully open position. In other words, the skin 16 remains connected to the panel 14 around the skin edges to limit the outward opening travel of the air bag door 20.

Figure 5:
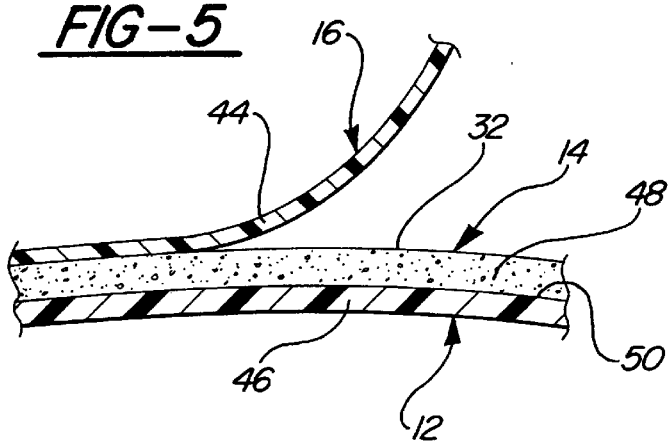
FIG. 5 is a fragmentary cross-sectional view of the air bag closure assembly taken along line 5—5 of FIG. 2.

As best shown in FIG. 5, the skin 16 comprises an outer membrane 44 of plastic material and has a generally uniform unweakened thickness throughout its covering of the door 20 and panel 14. The plastic material that makes up the skin membrane 44 comprises material from the group including urethanes, vinyls, olefins, esters, styrenes and rubbers.

However, other embodiments may include a skin having an outer membrane 44 made of a suitable non-plastic material, e.g., leather, fabric etc., rather than a plastic material as described above.

As best shown in FIG. 5, the panel 14 includes a retainer 46 and an outer foam layer 48 adhered to an outer surface 50 of the retainer. The retainer is a rigid substrate that provides structural support to the trim panel assembly 10. The retainer may be injection molded, compression molded, R.I.M. molded, blow molded or formed by any one of a number of suitable methods and of any one of a number of suitable materials.

The outer foam layer 48 is adhered to the outer surface 50 of the retainer by first applying a layer of adhesive to the outer surface 50 of the retainer. The foam layer also adheres to the skin 16 but forms a relatively weaker bond with the skin 16 than with the retainer. The adhesive holding the foam layer to the retainer has sufficient strength and is applied in such a way that the foam layer 48 remains with the retainer and delaminates from the skin 16 when the assembly 10 moves out of the closed position, i.e., when the air bag door 20 is forced open.

The door 20 also includes a foam layer. This foam layer is adhered to an outer surface of a rigid inner door panel by applying a layer of adhesive to the outer surface of the inner door panel. As with the foam layer of the panel, the foam layer of the door 20 forms a relatively weaker bond with the skin 16 than with the door 20. The adhesive that holds the foam layer to the door 20 has sufficient strength and is applied in such a way that the foam layer 48 remains with the door 20 but may at least partially delaminate from the skin 16 when the air bag forces the door 20 open.

Figure 3:
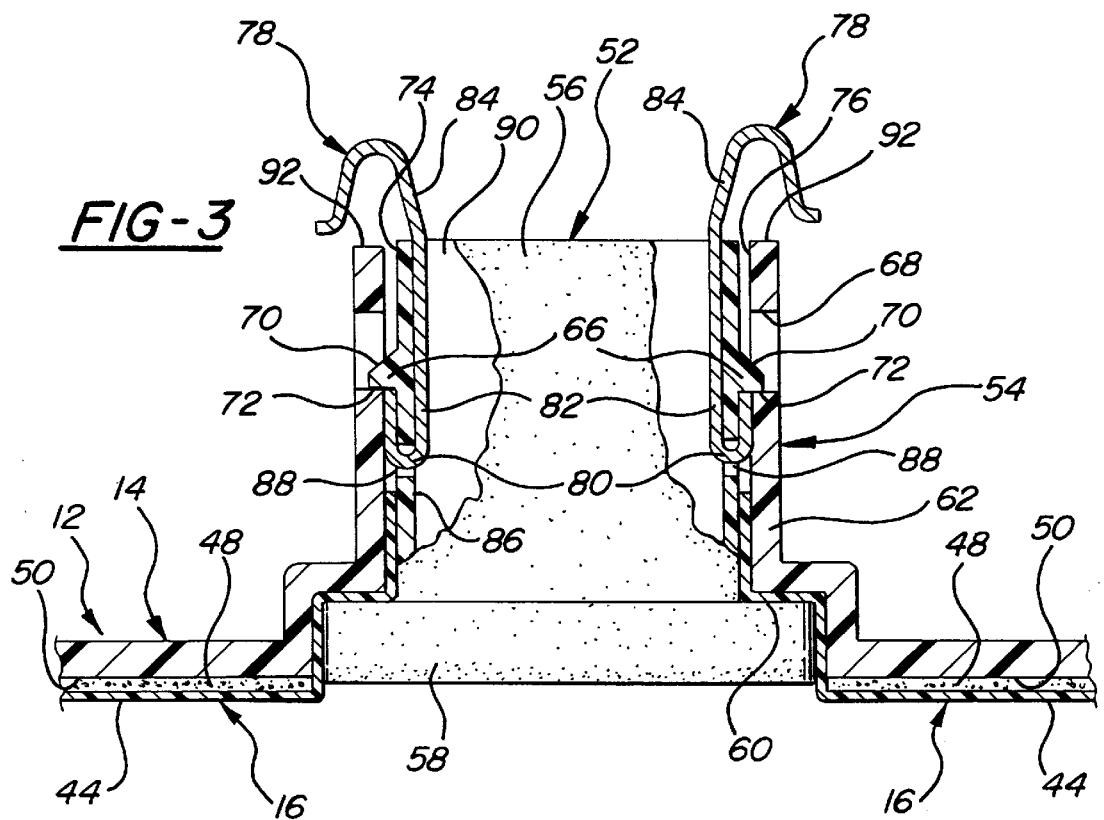
FIG. 3 is a partially cut-away cross-sectional side view of an air conditioning bezel constructed and mounted in a vehicle dash panel according to the present invention with the bezel in a normally retracted position.
Figure 4:
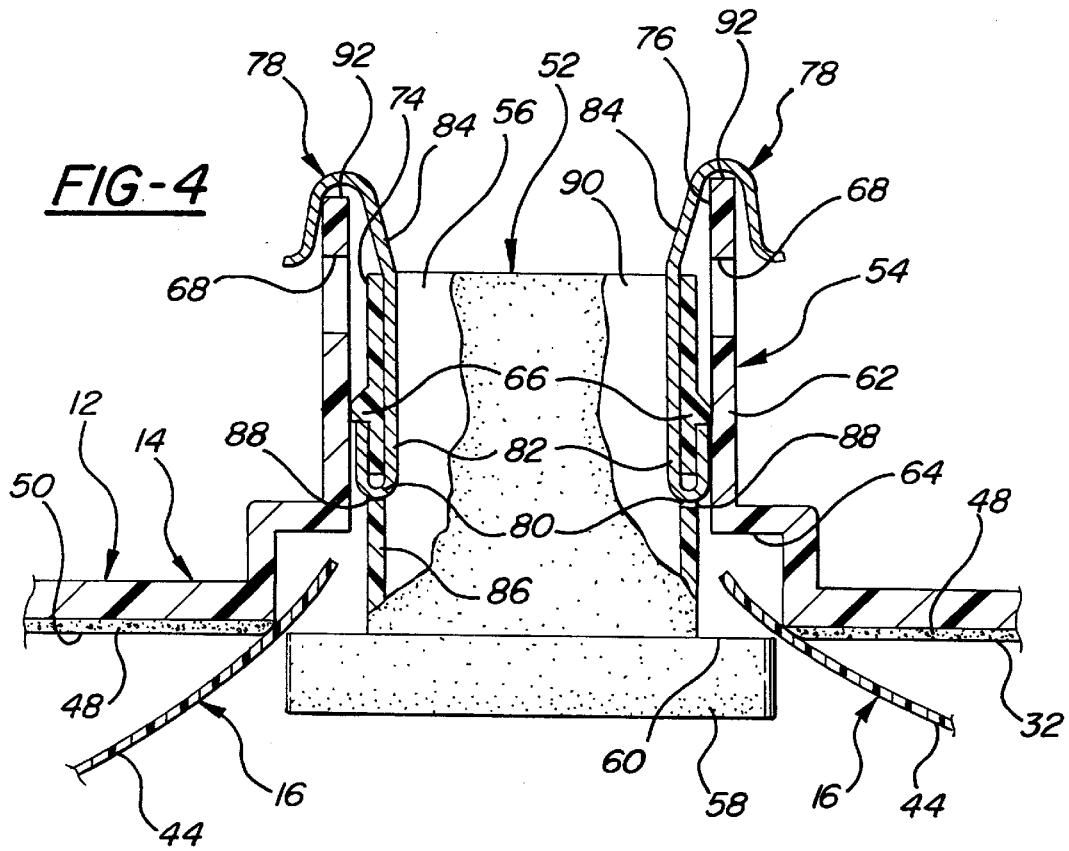
FIG. 4 is a partially cut-away cross-sectional side view of the air conditioning bezel of FIG. 3 with the bezel in an extended position.

Air conditioning bezels, generally indicated at 52 in FIGS. 1–4, are mounted in respective bezel receptacles, generally indicated at 54 in FIGS. 3 and 4. The bezel receptacles 54 are integrally formed in the panel 14. The bezels 52 are individually movable in an axial outward direction from mounted positions within the respective receptacles 54. Each bezel 52 has a rectangular tubular main body, shown at 56 in FIGS. 3 and 4, that extends integrally and axially inward from a generally rectangular face plate 58. The face plate 58 of each bezel 52 extends laterally outward from the main body 56 of the bezel 52 forming a peripheral ledge 60. Each face plate 58 includes a plurality of louvers to direct airflow from the tubular main body 56 into the passenger compartment. The bezels 52 need not be air conditioning bezels but may, instead, be any type of bezel to include defrost bezels or air vent bezels.

As shown in FIGS. 3 and 4, the bezel receptacles 54 are shaped to complement the exterior dimensions of their respective bezels 52. Each receptacle 54 includes a rectangular tubular main body 62 dimensioned to be slightly larger than and to slidably receive the rectangular tubular main body 56 of a bezel 52. As is best shown in FIG. 4, each receptacle 54 also includes a rectangular recess 64. The recess 64 is dimensioned to be slightly larger than and to slidably receive the peripheral ledge 60 and face plate 58 of a bezel 52 such that an outer surface of the bezel face plate 58 will lie flush with an outer surface of the surrounding skin 16. In each receptacle 54, the receptacle main body 62 extends integrally and axially inward from the receptacle recess 64.

A pair of protrusions, shown at 66 in FIGS. 3 and 4, integrally extends radially outward from each bezel main body 56. With a bezel 52 in the mounted position, the protrusions 66 engage a pair of receptacle windows 68 formed into the receptacle main body 62. The protrusions 66 have ramped inner surfaces 70 that allow the bezels 52 to be snap-fit into their mounted positions in their respective receptacles 54. The protrusions 66 have perpendicular outer surfaces 72 to prevent the bezels 52 from being easily withdrawn from their mounted positions. However, when sufficient force is applied to a bezel 52 in an axially outward direction, at least a portion of each protrusion 66 will yield or break, as shown in FIG. 4, to allow the bezel 52 to move out of the mounted position.

The skin 16 extends around each bezel 52 and axially into each bezel receptacle 54 between an outer surface of each bezel 52 and an inner surface of each bezel receptacle 54 as shown in FIG. 3. The skin 16 extends past the bezel ledge 60 and receptacle recess 64 and into a region between the bezel main body 56 and the receptacle main body 62. The skin 16 is sandwiched between a bezel outer surface 74 and a receptacle inner surface 76 when the bezel 52 is in the mounted position in the bezel receptacle 54 as shown in FIG. 3.

Each bezel 52 is axially outwardly movable from its mounted position when the skin 16 is pulled outward from between the bezel outer surface 74 and the receptacle inner surface 76. Each bezel 52 includes a pair of moorings, generally indicated at 78 in FIGS. 3 and 4. The moorings 78 are positioned to arrest the axial outward motion of each bezel 52 from its mounted position when the skin 16 is delaminated from the panel outer surface 32 and is withdrawn from between the bezel 52 and the bezel receptacle 54 as shown in FIG. 4. The moorings 78 prevent the bezels 52 from becoming projectiles when the air bag deploys. In other words, in response to skin 16 delamination the moorings 78 anchor the bezels 52 to the panel 14 as the skin 16 is delaminated from the panel 14 during air bag deployment.

Each mooring 78 comprises a flat, elongated metallic clip having an inner hook portion 84, a straight section 82 and an outer hook portion 80. The straight section 82 of each mooring is disposed against an inner surface 86 of the main body 56 of the host bezel 52. The outer hook portion 80 of each mooring 78 extends integrally from an outer end of the straight section 82 of each mooring 78. The outer hook portion 80 of each mooring 78 engages its host bezel 52 by extending radially outward through an aperture 88 in the host bezel main body 56 then turning to extend axially outward between the host bezel main body 56 and the receptacle main body 62.

The inner hook portion 84 of each mooring 78 integrally extends from an inner end of the straight section 82 of each mooring 78. Each inner hook portion 84 then emerges from an inner end opening 90 of the host bezel main body 56 in a generally outward radial direction with respect to the host bezel main body outer surface. Each respective receptacle 54 includes a receptacle detent 92 that is axially aligned with the inner hook portion 84 of each respective mooring 78. Each detent 92 is engageable with the inner hook portion 84 of the respective mooring 78 when a bezel 52 is pulled axially out of the mounted position as shown in FIG. 4. Each receptacle detent 92 is disposed on an inner edge or rim of the main body portion of a bezel receptacle 54. The inner hook portion 84 of each mooring 78 is aligned to engage the detent 92, i.e., the inner edge of the bezel receptacle 54, when the bezel 52 is pulled axially out of the mounted position.

Figure 6:
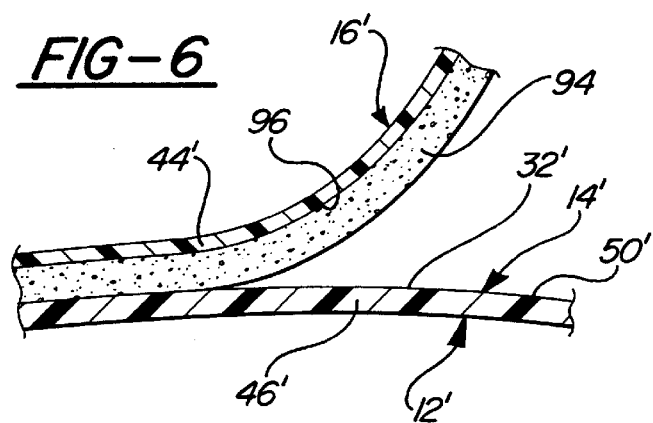
FIG. 6 is a fragmentary cross-sectional view of an alternative panel and skin construction for an air bag closure assembly constructed according to the invention.

According to the second embodiment of the skin 16' and panel 14' structure shown in FIG. 6, the skin 16' includes an inner foam layer 94 adhered to an inner surface 96 of the skin membrane 44' rather than an outer foam layer 48 attached to a panel retainer. This inner foam layer 94 may be made of the same composition as the plastic material making up the skin membrane 44'. The inner foam layer 94 of the skin 16' is adhered to the inner surface 96 of the skin membrane 44' with sufficient strength that the inner foam layer 94 remains with the membrane 44' and delaminates from the panel outer surface 32' when the assembly 10 moves out of the closed position toward the open position.

Figure 7:
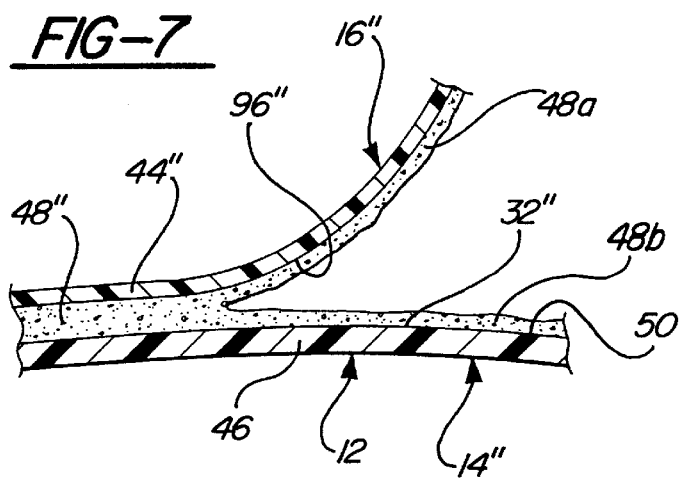
FIG. 7 is a fragmentary cross-sectional view of another alternative panel and skin construction for an air bag closure assembly constructed according to the invention.

According to the third embodiment of the skin 16" and panel 14" structure shown in FIG. 7, the foam layer 48" is strongly adhered to both the inner surface 96" of the skin 16" and the outer surface 50" of the panel retainer 46". The foam layer 48" is adhered to the both the skin 16" and the retainer 46" with sufficient strength that the foam layer 48", rather than delaminating from either the skin 16" or the retainer 46", will itself tear into two separate foam lamina 48a, 48b. In other words, the skin-foam-insert assembly 16", 48", 46" is designed to fail cohesively within the foam layer 48" rather than adhesively between layers. As a result, an outer foam lamina 48a remains adhered to the skin 16" and an inner foam lamina 48b remains adhered to the retainer 46" when the assembly moves out of the closed position toward the open position.

In a variation on the skin 16 and panel 14 structure of the first embodiment, the outer foam layer 48 may be adhered to the outer surface 50 of the retainer without applying adhesive between the two surfaces. For example, where the foam 48 is applied by a foam-in-place method, the foam layer 48 may be formulated to include an adhesion-promoter that will adhere to the outer surface 50 of the retainer on contact. The adhesive bond between foam and skin 16 may be made relatively weaker than the bond between foam and retainer. This may be done by any one or more of a number of means such as using a release agent in the skin composition, no adhesion promoter, or by applying the adhesion promoter in a different way or in a different pattern.

In either the first or the second embodiment, rather than remaining partly attached to the panel 14, the skin 16 may completely separate from the panel 14 or may tear and separate from the panel 14 by a combination of tearing and delamination. Preferably, in such embodiments, the surrounding portion of separable skin 16 should not extend more than a marginal distance outward from the air bag deployment opening 18. Limiting the area of separable skin 16 helps to insure that the skin 16 will completely separate from the panel 14 and release the door 20.

In either the first or second embodiment, separation may occur at least partially within the foam layer 48, 94 itself rather than between the foam layer 48, 94 and the skin 16 or the foam layer 48, 94 and the retainer 46. In other words, the foam layer 48, 94 may at least partially tear into two foam layers, one layer remaining adhered to the skin 16 and the other remaining adhered to the retainer 46 as in the third embodiment.

In either the first or second embodiment the door 20 may or may not include a foam layer. Where a door 20 includes a foam layer, the foam layer may remain with the skin rather than the door 20 upon door opening. The skin may also remain adhered to the door 20 throughout air bag deployment rather than separating from the door 20.

In other embodiments of the present invention, rather than being pivotally mounted on a hinge, the door 20 may be attached to the panel 14 only by the overlying skin 16. In such embodiments, the skin 16 carries the door 20 upward and forward toward the windshield without the aid of a hinge.

In practice, an air bag may be deployably concealed according to the invention by first forming the trim member 12 and the door 20. The door 20 is then mounted in the air bag deployment opening 18 in the panel portion of the trim member 12 with the door outer surface 30 disposed flush with the panel outer surface 32. The skin 16 is then attached to the flush door and panel outer surfaces 30, 32 in a continuous layered disposition spanning the seam 34 between the door and the panel 14. The skin 16 is attached using an appropriate adhesive in such a way that the skin 16 can be delaminated or "peeled back" from the portion of the panel outer surface 32 that extends laterally outward from the side edges 26 and front edge 22 of the door 20 to a front edge 38 of the skin 16 adjacent the front edge 22 of the door 20.

An air bag (not shown) may then be supported behind the assembly 10 in a position to cause the air bag, when deployed, to inflate into contact with the door 20, forcing the door 20 to rotate outwardly from the closed position. As the door 20 rotates outwardly it causes the skin 16 to delaminate from at least a portion of the panel outer surface 32 and to form the skin tent 36 over the door 20. The forward edge of the skin tent 36 tears free forming the tent opening 40. As it continues to inflate, the air bag deploys through the panel opening 18 and the skin tent opening 40 and into the passenger compartment. The skin 16 delaminates from the panel 14 to absorb door opening forces and forms a tent 36 over the door 20 to prevent the door 20 from breaking free of the trim panel 14 and becoming a projectile. The skin tent opening 40 provides an exit for the deploying air bag.

The description and drawings illustratively set forth my presently preferred invention embodiments. I intend the description and drawings to describe these embodiments and not to limit the scope of my invention. Obviously, it is possible to modify these embodiments while remaining within the scope of the following claims. Therefore, within the scope of the claims, one may practice the invention otherwise than as the description and drawings specifically show and describe.

I claim:

1. An air bag closure assembly comprising:
   a trim member including a panel and a skin;
   an air bag deployment opening disposed in the panel;
   a door having a front edge, a rear margin opposite the front edge and a pair of side edges, the door supported for pivotal movement around a hinge disposed adjacent the rear margin of the door and the air bag deployment opening;
   the skin supported on outer surfaces of the door and the trim member panel;
   a closed position in which the door closes the opening and the door outer surface is disposed adjacent the panel outer surface forming a seam between the door and the panel, the skin extending laterally across the seam between the door and panel outer surfaces in a layered disposition to conceal the door and panel from vehicle occupants;
   an open position in which the front edge of the door is pivoted away from the opening around the hinge to provide an air bag deployment path through the panel; and
   the skin being at least partially separable from at least a portion of the panel outer surface that extends laterally outward from the side edges of the door and from the front edge of the door to a front edge of the skin adjacent the front edge of the door, the skin delaminating when the door carries the skin outwardly and lifts the skin from the panel outer surface as an air bag inflates and forces the door out of the closed position toward the open position, the skin forming a skin tent over the door when the door is out of the closed position, the skin tent having a skin tent opening formed by the delaminated front edge of the skin, the skin delaminating to absorb door opening forces, the skin tent opening providing an exit for the deploying air bag.

2. An air bag closure assembly as defined in claim 1 in which the skin covers and adheres to a surrounding portion of the panel outer surface that is greater in area than the door outer surface.

3. An air bag closure assembly as defined in claim 1 in which the skin has an edge region that remains adhered to a portion of the panel when the front edge delaminates.

4. An air bag closure assembly as defined in claim 1 in which the skin comprises an outer membrane of plastic material.

5. An air bag closure assembly as defined in claim 4 in which the skin includes an inner foam layer adhered to a membrane inner surface.

6. An air bag closure assembly as defined in claim 5 in which the inner foam layer is made of the same composition as the plastic material.

7. An air bag closure assembly as defined in claim 5 in which the inner foam layer is adhered to the membrane inner surface with sufficient strength that the inner foam layer remains with the membrane and delaminates from the panel outer surface when the assembly moves out of the closed position toward the open position.

8. An air bag closure assembly as defined in claim 4 in which the plastic material comprises material selected from the group consisting of urethanes, vinyls, olefins, esters, styrenes and rubbers.

9. An air bag closure assembly as defined in claim 4 in which the panel includes a retainer and an outer foam layer adhered to an outer surface of the retainer.

10. An air bag closure assembly as defined in claim in 9 in which the outer foam layer is adhered to the outer surface of the retainer and the inner surface of the skin with sufficient strength that the foam layer tears into inner and outer foam lamina when the assembly moves out of the closed position toward the open position, the inner foam lamina remaining adhered to the outer surface of the retainer and the outer foam lamina remaining adhered to the inner surface of the skin.

11. An air bag closure assembly as defined in claim 9 which the outer foam layer is adhered to the outer surface of the retainer and the inner surface of the skin with sufficient strength that the foam layer tears when the assembly moves out of the closed position toward the open position.

12. An air bag closure assembly as defined in claim 1 in which the skin has a generally uniform unweakened thickness throughout its covering of the door and panel.

13. An air bag closure assembly as defined in claim 1 in which:
   a bezel is mounted in a bezel receptacle in the panel and is movable in an axial outward direction from a mounted position in the receptacle;
   the skin extends around the bezel and into the receptacle between a bezel outer surface and a receptacle inner surface;
   the skin is sandwiched between the bezel outer surface and the receptacle inner surface when the bezel is in the mounted position;
   the bezel is axially outwardly movable from the mounted position when the skin is pulled outward from between the bezel outer surface and the receptacle inner surface; and
   a mooring arrests the axial outward motion of the bezel from the mounted position as the skin is withdrawn from between the bezel and the receptacle.

14. An air bag closure assembly as defined in claim 13 in which the mooring comprises a clip connected to the bezel, the clip having a hook portion that extends in a generally outward radial direction from the bezel outer surface; and the receptacle includes a receptacle detent that is axially aligned with the hook portion of the clip and is engageable with the hook portion when the bezel is pulled axially out of the mounted position.

15. An air bag closure assembly as defined in claim 14 in which the receptacle detent is disposed on an inner edge of the bezel receptacle, the hook portion of the clip engageable with the inner edge of the bezel receptacle when the bezel is pulled axially out of the mounted position.

16. An air bag closure assembly comprising:
   a trim member including a panel and a skin;
   an air bag deployment opening disposed in the panel;
   a door supported for pivotal movement around a hinge and disposed adjacent the air bag deployment opening;
   the skin supported on outer surfaces of the door and the trim member panel;
   a closed position in which the door closes the opening forming a seam between the door and the panel, the skin extending across the seam between the door and panel outer surfaces in a layered disposition to conceal the seam from vehicle occupants;
   an open position in which the door is pivoted away from the opening around the hinge to provide an air bag deployment path through the panel;
   the skin covering and adhering to a surrounding portion of the panel when the door is in the closed position, the surrounding portion of the panel outer surface being greater in area than the door outer surface; and
   the skin being separable from the surrounding portion of the panel outer surface when the door carries the skin outwardly and lifts the skin from the surrounding portion of the panel outer surface as an air bag inflates and forces the door out of the closed position toward the open position, the skin being separable from the surrounding portion of the panel outer surface to provide an exit for a deploying air bag.

17. An air bag closure assembly as defined in claim 16 in which the skin comprises an outer membrane of plastic material.

18. An air bag closure assembly as defined in claim 17 in which the skin includes an inner foam layer adhered to a membrane inner surface.

19. An air bag closure assembly as defined in claim 18 in which the inner foam layer is made of the same composition as the plastic material.

20. An air bag closure assembly as defined in claim 18 in which the inner foam layer is adhered to the membrane inner surface with sufficient strength that the inner foam layer remains with the membrane and delaminates from the panel outer surface when the assembly moves out of the closed position toward the open position.

21. An air bag closure assembly as defined in claim 17 in which the plastic material comprises material from the group including urethanes, vinyls, olefins, esters, styrenes and rubbers.

22. An air bag closure assembly as defined in claim 16 in which the panel includes a retainer and an outer foam layer adhered to an outer surface of the retainer.

23. An air bag closure assembly as defined in claim 22 in which the outer foam layer is adhered to the outer surface of the retainer with sufficient strength that the outer foam layer remains with the retainer and delaminates from the skin when the assembly moves out of the closed position toward the open position.

24. An air bag closure assembly as defined in claim 22 in which the outer foam layer is adhered to the outer surface of the retainer and an inner surface of the skin with sufficient strength that the foam layer tears into inner and outer foam lamina when the assembly moves out of the closed position toward the open position, the inner foam lamina remaining adhered to the outer surface of the retainer and the outer foam lamina remaining adhered to the inner surface of the skin.

25. An air bag closure assembly as defined in claim 16 in which the skin has a generally uniform unweakened thickness throughout its covering of the door and panel.

26. A method of deployably concealing an air bag including the steps of:
   providing a trim member including a panel and a skin;
   providing an air bag deployment opening in the panel;
   providing a door in the opening to close the opening with a door outer surface disposed adjacent a panel outer surface and forming a seam between the door and the panel;
   supporting the door for pivotal movement around a hinge disposed adjacent a rear margin of the door and the air bag deployment opening such that a front edge of the door can be pivoted away from the opening around the hinge to provide an air bag deployment path through the panel; and attaching the skin to the door and panel outer surfaces in a continuous layered disposition spanning the seam such that the skin can be at least partially delaminated from at least a portion of the panel outer surface that extends laterally outward from side edges and front edge of the door to a front edge of the skin adjacent the front edge of the door.

27. The method of claim 26 in which the step of attaching includes the additional step of providing an adhesive between the skin and the outer surfaces of the door and panel.

* * * * *